Aug. 8, 1933.  A. LEIB  1,921,234
GRADUATED CIRCLE FOR RADIO DIRECTION FINDERS
Filed July 22, 1929  2 Sheets-Sheet 1

INVENTOR
AUGUST LEIB
BY
ATTORNEY

Aug. 8, 1933.    A. LEIB    1,921,234
GRADUATED CIRCLE FOR RADIO DIRECTION FINDERS
Filed July 22, 1929    2 Sheets-Sheet 2

INVENTOR
AUGUST LEIB
BY
ATTORNEY

Patented Aug. 8, 1933

1,921,234

UNITED STATES PATENT OFFICE 1,921,234

GRADUATED CIRCLE FOR RADIO DIRECTION FINDERS

August Leib, Berlin, Germany, assignor to Telefunken Gesellschaft für Drahtlose Telegraphie, m. b. H., Berlin, Germany Application July 22, 1929, Serial No. 380,169, and in Germany August 4, 1928

2 Claims. (Cl. 250—11)

It is known that the readings taken of bearings in a direction finder circuit must be corrected by means of tabulations or graphs. For every angle thus read, a corrective value must be found in and applied from the table or graph to the bearing reading. This requires the expenditure of a certain time, and this time is to be saved according to the present invention. The corrective values, according to this invention, are indicated upon the direction finding dial in graphic form in such a way that their abscissa axis is a circle concentric with, or coinciding with, the direction finding circle, while the radial rays or lines corresponding to the scales serve as the ordinates.

The invention will be better understood by reference to the annexed drawings in which Fig. 1 shows a radio compass arranged in accordance with my invention;

Fig. 2 shows a modification of Fig. 1, while,

Figure 1:
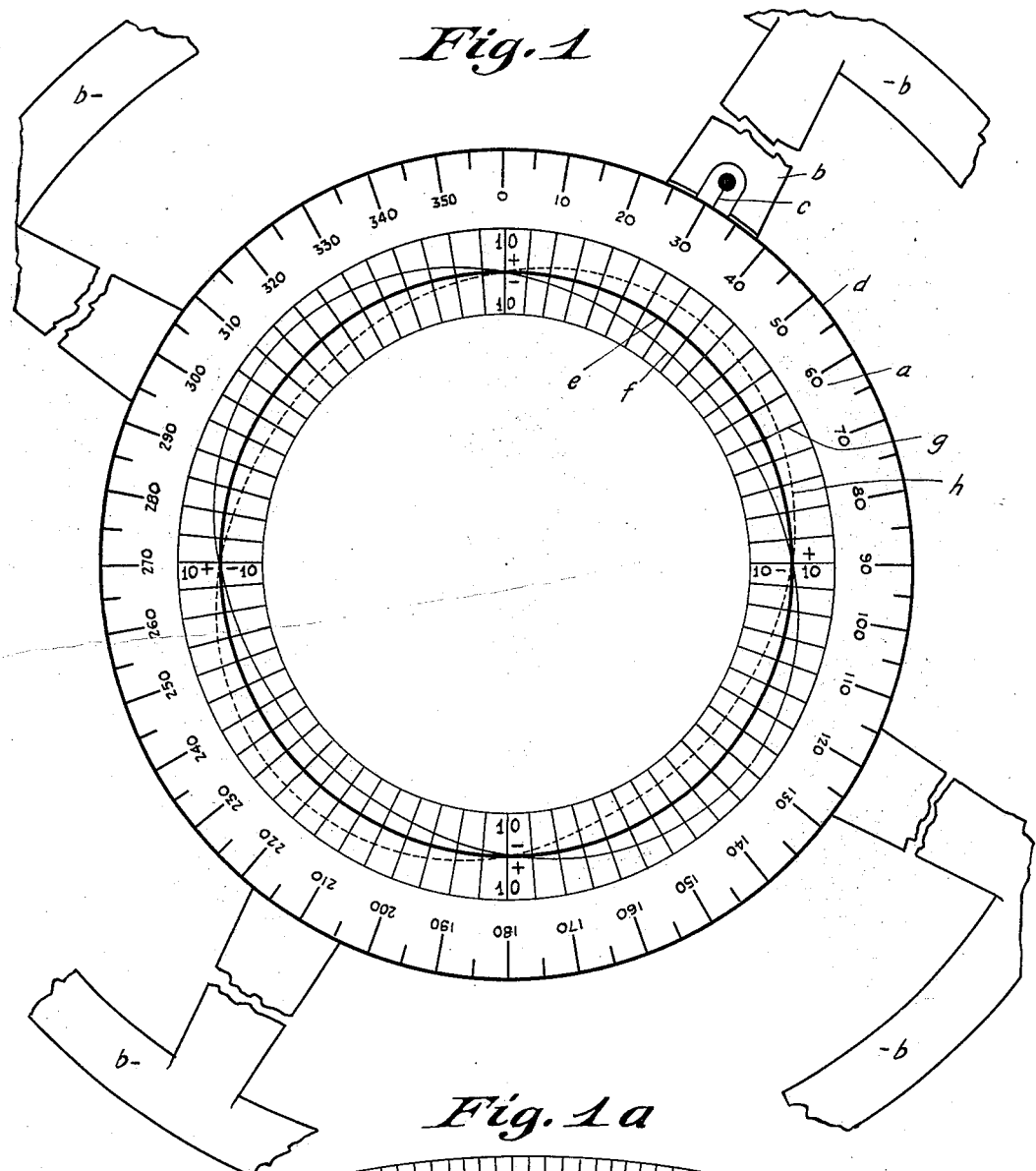
Fig. 1a shows an enlarged detail of Fig. 1.

Referring to Fig. 1, $a$ is the graduated circle having a fixed position with reference to the hull of the ship, its graduation between 0 and 180 degrees corresponds to the midship or median line (0 at the bow and 180 degrees at the stern).

$b$ is the direction finding wheel which is connected with the directional element of the radio direction finder, and which carries a pointer $c$ serving for reading bearings. $d$ is a reading border of the graduated circle. The circle $e$ being concentric thereto serves as the abscissa, and the radially extending rays or lines $g$ serve as the ordinates for the correction curves $f$ and $h$.

Figure 1A:
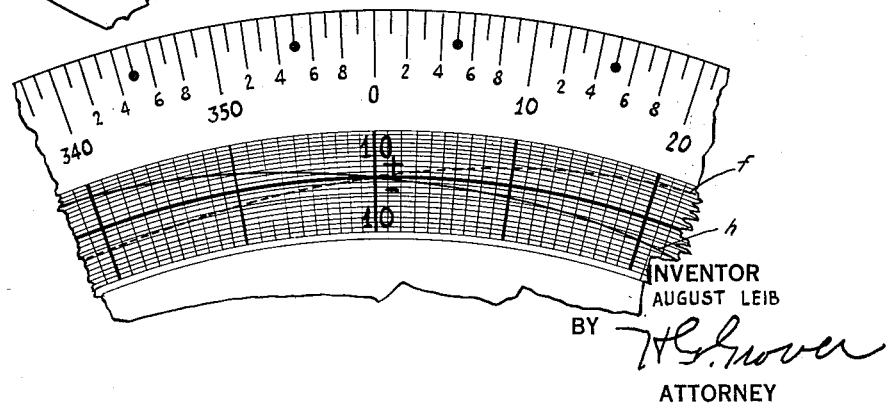

Fig. 1a for the sake of greater clearness illustrates a part of the graduated bearing circle drawn to an enlarged scale.

Now, if the angle read in the direction-finder is $=q$ and the necessary correction $=f$, then the correct bearing is $p=q+f$. If the correct bearing $f$ is to be ascertained merely from the uncorrected reading taken on the direction finder $q$, then the use of a curve, say, $f$ will suffice. If in taking bearings, the pointer $c$ is positioned on the corresponding division $q$ of the bearing scale or circle, then the ray or line $g$ being in its direction intersects on the corrective curve $f$ the requisite corrective ordinate $f$. If the curve $f$ falls inside the abscissa circle, then the sense of correction is, for instance, negative, otherwise it is positive. At any rate, both readings $q\pm f$ result in the accurate bearing $p$.

But if for a definite course of the vessel $p$ the corresponding radio bearing $q$ is to be ascertained—and this happens quite often—then recourse must be had to the other corrective curve $h$. The indicator hand $c$ is positioned upon the particular value of $p$, and the corresponding ordinate ray or line $g$ results in the correction reading $h$. There is $q+h=p$.

In order to avoid confusion of the graphs $f$ and $h$, it is advisable to distinguish them in some suitable way.

In order to facilitate the reading of the correction quantities, it is advisable to trace upon the direction finder dial a system of auxiliary curves concentrically intersecting with the rays or lines $g$.

The abscissa circle $e$ could also be made concentric with the reading border $d$ of the graduated circle. In this case each of the curves, say, curve $f$ is plotted or traced in such a way that both for positive as well as for negative corrections it comes to fall entirely inside or outside the abscissa circle, according to whether the inner or outer edge of the graduated circle is needed for reading. But the positive or negative sense of the corrections must then be made distinguishable by different ways of tracing. For instance, the sections resulting in negative values could be plotted in red color, and the sections giving positive values in green color.

An arrangement of the kind here disclosed could be further improved so that all calculation is saved by that the reading edge of the graduated or bearing circle is used as the abscissa circle of the correction curve, and that over the graduated circle with the correction curves there is used an indicator hand drawn upon transparent material whence two line systems (say, circular systems) extend in both directions which are characterized or distinguished as regards the sign of correction in agreement with the respective sections of the corrective curve.

Figure 2:
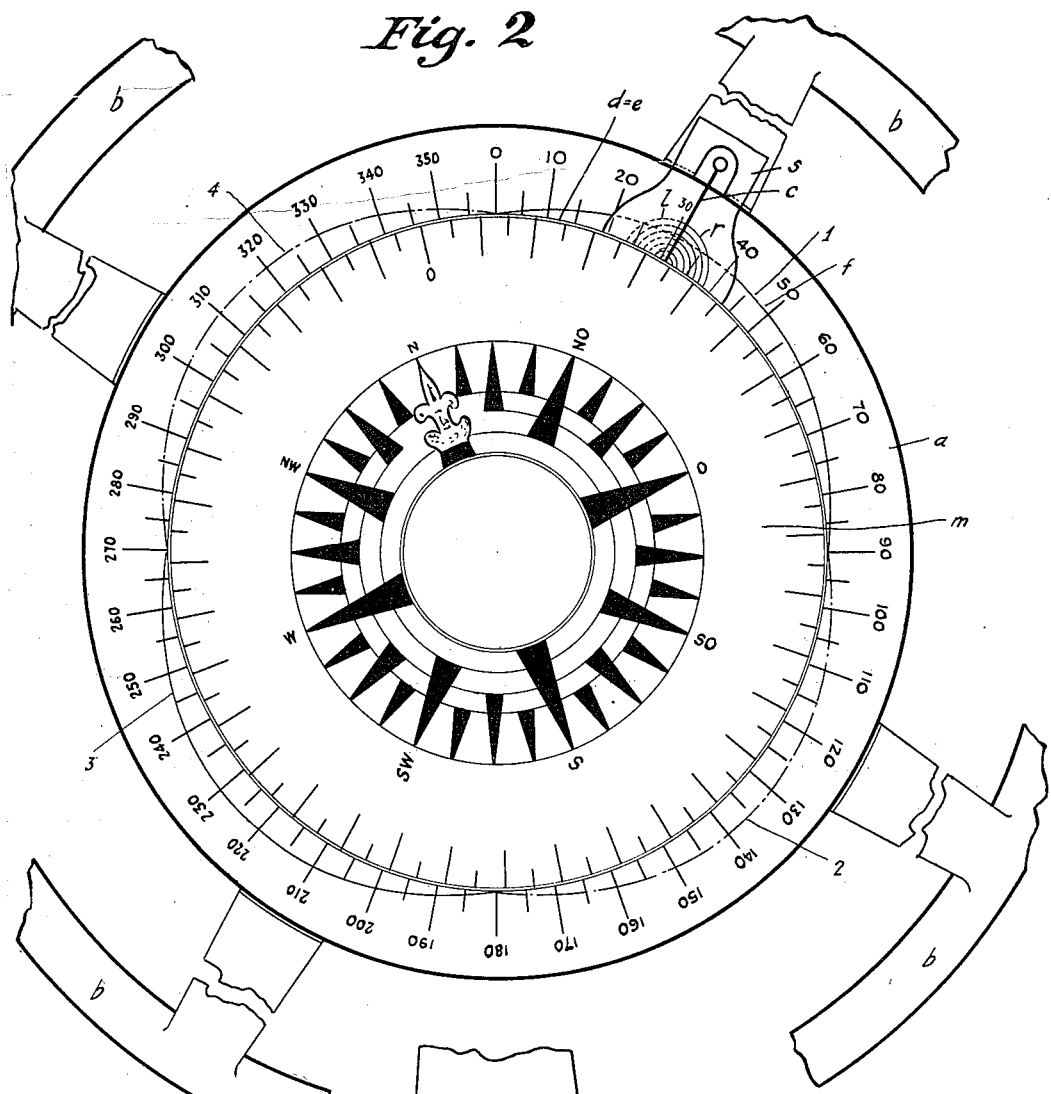

Fig. 2 illustrates by way of example an embodiment of this idea. The bearing scale is plotted upon the inner edge $d$ of the bearing dial $a$. The circle $d$ serves at the same time as abscissa circle of the corrective curve $f$. For the latter, the sections 1 and 3 are shown, for example, green and give the positive corrections, while sections 2 and 4 are traced, for instance, red, and indicate the negative corrections. The indicator hand $c$ is traced in the shape of a line of demarcation upon a piece of plate (made from celluloid, for instance) secured to the direction finder wheel. Starting from indicator hand $c$ there are plotted upon the transparent plate $s$ two line systems (here, for instance, circular systems). The one on the left-hand side $l$ corresponds to negative corrections, and is drawn red like sections 1 and 3, while the right-hand one $r$ corresponds to positive corrections; it is drawn green and is co-ordinated to sections 2 and 4 of the correction curves.

Figure 2A:
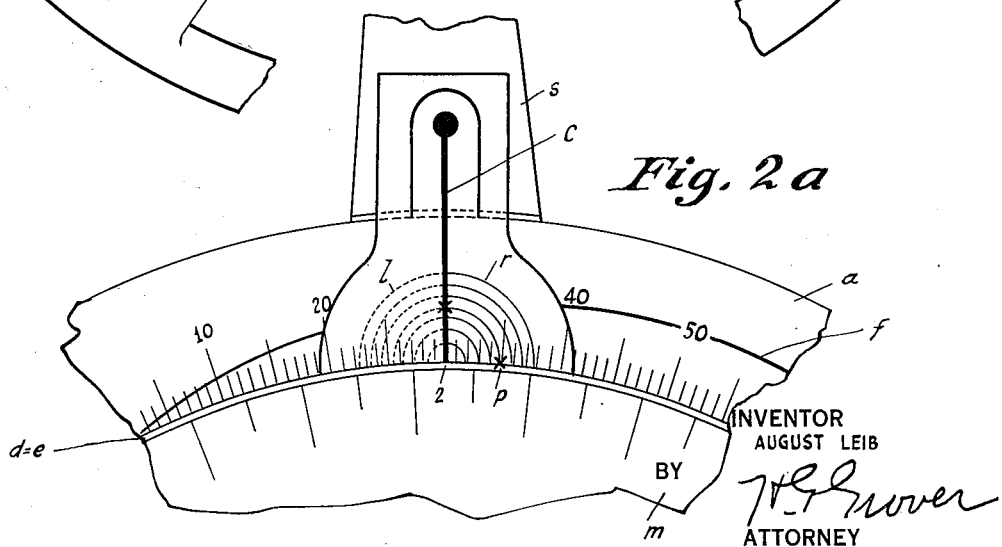
Fig. 2a shows in an enlarged view a detail of the arrangement of Fig. 2.

Part of the arrangement which comprises the plate piece S with indicator hand $c$ is illustrated again for the sake of greater clearness to an enlarged scale in Fig. 2a.

Now, the reading of the correct bearing angle $p$ is effected in this manner that the ordinate of curve $f$ which is cut off between the reading edge 4 and the correction curve $f$ upon the indicator line $c$, is projected by the corresponding line of the $n$ or $l$ system in the correct sense upon the reading scale. For instance, in case the indicator line $c$ in taking bearings is over the green section of the correction curve (indicating positive corrections), then the $s$-system which is also traced green is to be used. That circle of the $r$-system is then employed which passes through the point of intersection of $c$ and $f$, and one follows this circle as far as its point of intersection with the reading edge $d$, and the latter gives the correct reading $p$.

It is recommendable to provide inside the direction-finder dial or disk $a$ (which in this case has the shape of a circular ring) a movable compass circle $m$ to reproduce the movements of the compass needle. The graduated scale of this circle is arranged at its circumferential edge, that is to say, opposite the bearing scale edge $d$. It is then possible to read not only the correct bearing angle in relation to the midship (median) line on the scale $d$, but also the angle of the bearing in reference to the compass card on the compass scale $n$.

I claim:

1. A correction chart to be used with directional radio apparatus inherently subject to pointing errors comprising, a bearing circle, correction curves plotted on said bearing circle, a reading edge or border on said bearing circle which serves as the abscissa circle for the correction curves which are plotted thereon, bearing reading means adapted to be moved over the bearing circle and correction curves, said means comprising transparent material having an edge adjacent the reading edge of said bearing circle, a reference line on said transparent material and a plurality of lines terminating at each end at a point adjacent said reading circle, said lines being intersected by said reference line.

2. A correction chart to be used with a directional radio system inherently subject to pointing errors comprising, a bearing circle, a reading edge or border on said bearing circle which serves as the abscissa circle for the correction curves which are plotted thereon, bearing reading means adapted to be moved over the correction circle and correction curves, said means comprising transparent material having an edge adjacent the reading edge of said bearing circle, a reference line on said transparent material for reading the apparent bearing of said system and means for reading the true bearing of said system comprising a plurality of lines terminating at each end at a point adjacent said reading circle, said lines being intersected by said reference line.

AUGUST LEIB.